UNITED STATES PATENT OFFICE.

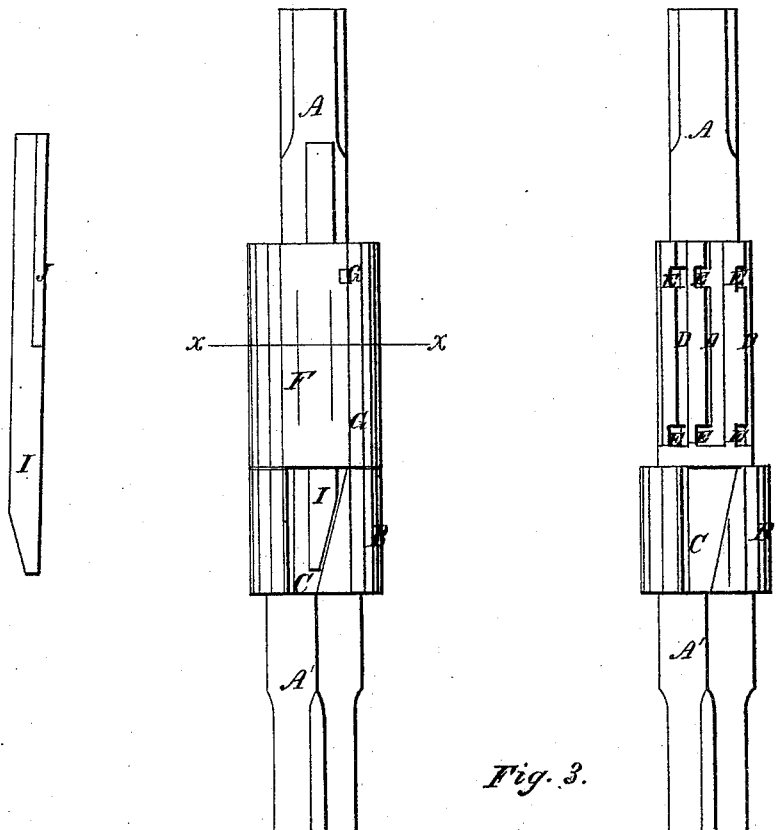

V. T. PRIEST, OF DECATUR, ILLINOIS.

IMPROVEMENT IN COLLARS FOR DRILL-RODS.

Specification forming part of Letters Patent No. 56,607, dated July 24, 1866.

*To all whom it may concern:*

Be it known that I, V. T. PRIEST, of Decatur, in the county of Macon and State of Illinois, have invented a new and useful Improvement in Joints for Drill-Rods; and I do hereby declare that the following is a full, clear, and exact description thereof, which will enable others skilled in the art to make and use the same, reference being had to the accompanying drawings, forming part of this specification, in which—

Figure 1 is a peripherical view of a joint made according to my invention. Fig. 2 is a view of the joint without the band or collar. Fig. 3 is a sectional view of the band or collar in the plane $x$, Fig. 1.

Similar letters of reference indicate like parts.

This invention consists in a novel screw connection or joint for drill-rods or other rods, wherein an adjustable band is used in connection with a key and key-seat, whereby the sections of the rod which are screwed together are locked securely, so as to prevent them from becoming unscrewed by reason of jars in the operation of drilling.

The letters A A′ designate two sections of a drill-rod, which are joined together by means of a screw on the end of one, which is screwed into a socket formed in the end of the other. The section A′ is enlarged in diameter at the end which has the socket, so as to form a collar or circular shoulder, B, across which is cut a key-seat, C, one edge of which is straight and the other inclined in such a direction as to make the seat wider above than below. The section A is made cylindrical for a little distance at the end which is adjacent to the joint; but its diameter is less than that of the collar B of the other section, and such cylindrical part has numerous longitudinal grooves, D, that are extended nearly to the bottom of the section, being placed around the periphery at equal or nearly equal distances apart.

The letters E E designate lateral recesses which communicate with the left-hand side of each groove D, their positions being at the bottom and near the top of said grooves D. The upper ends of the grooves D are open, being continued through the upper edge of the cylindrical part of said section A of the drill-rod.

The letter F designates a locking band or collar, whose internal diameter is such as to permit it to go over the cylindrical part of section A, its end coming near to or against the collar B, whose diameter is about equal to the external diameter of the band.

The interior of the band has two pins, G G, placed in the same straight line at such a distance apart as, when the band is placed around the grooved part of section A, will bring them opposite to the lateral recesses E.

In setting the band in its place its pins G move along one of the grooves D until they come opposite the recesses E, which they are made to enter by turning the band toward the left. The interior of the band has a longitudinal groove, H, extending from end to end of the band on the right hand of and near to the pins G, to receive a key, I, the breadth of the groove H and its position relatively to the pins G being such that when the band is rotated so as to move the pins into the recesses E said groove is directly over that groove D of the rod which was entered by the pins, the edge of groove H which is nearest the pins being coincident with the corresponding edge of groove D; but the groove H exceeds the groove D in width, so that its other edge overlaps the groove D on the side opposite the recesses. The groove H is made wide enough to receive the key I, which is a flat piece of metal of greater length than the united length of the band F and shoulder B, its lower part being made oblique to correspond with the inclined side of the key-seat. The inner face of the key on its straight side has a rib or spline, J, which fits easily within any of the grooves D when the key is pushed down to its place.

The operation of the device is as follows: The sections A A′ of the drill or other rod having been screwed together, the band F is lowered to its place about the grooves D and rotated until its pins are placed in the lateral recesses E. The key I is then shoved down beneath the band through the groove H, its rib J sliding along that groove D which is opposite groove H of the band, the lower part of the key occupying the key-seat C in the top of part A′ of the drill-rod.

By means of this construction the key, being confined by the straight groove of the band and having an angular side moving against the angular edge of the seat, is continually drawn downward and forward at every stroke of the drill, moving the band around at the same time, and so tightening the screw-joint. When the joint wears away so as to prevent the miters or inclinations of the key and key-seat from working in contact the band can be moved back to the next groove D, and so continually until the screw-joint is worn out.

I claim as new and desire to secure by Letters Patent—

1. The combination of the section A' and grooved section A, connected by a screw-joint, with the inclined or mitered key I and key-seat C, the adjustable band F, and groove H, substantially as described.

2. The grooves D and recesses E in the upper section or rod, A, in combination with the band F, having internal pins, G, substantially as described.

The above specification of my invention signed by me this 27th day of March, 1866.

V. T. PRIEST.

Witnesses:
S. C. NORWOOD,
A. E. CHISHOLM.